(12) United States Patent
Baldwin

(10) Patent No.: US 9,652,083 B2
(45) Date of Patent: May 16, 2017

(54) INTEGRATED NEAR FIELD SENSOR FOR DISPLAY DEVICES

(71) Applicant: Amazon Technologies, Inc., Reno, NV (US)

(72) Inventor: Leo B. Baldwin, San Jose, CA (US)

(73) Assignee: AMAZON TECHNOLOGIES, INC., Reno, NV (US)

(*) Notice: Subject to any disclaimer, the term of this patent is extended or adjusted under 35 U.S.C. 154(b) by 0 days.

(21) Appl. No.: 15/061,868

(22) Filed: Mar. 4, 2016

(65) Prior Publication Data

US 2016/0259483 A1 Sep. 8, 2016

Related U.S. Application Data

(62) Division of application No. 13/432,675, filed on Mar. 28, 2012, now Pat. No. 9,285,895.

(51) Int. Cl.
*G06F 3/042* (2006.01)
*G06F 3/03* (2006.01)
(Continued)

(52) U.S. Cl.
CPC .......... *G06F 3/0421* (2013.01); *G06F 3/0325* (2013.01); *G06F 3/0425* (2013.01);
(Continued)

(58) Field of Classification Search
CPC ........ G06F 3/0421; G06F 2203/04108; G06F 3/0325; G06F 3/0425; G06F 3/04883;
(Continued)

(56) References Cited

U.S. PATENT DOCUMENTS 4,836,670 A 6/1989 Hutchinson
5,563,988 A 10/1996 Maes et al.
(Continued)

FOREIGN PATENT DOCUMENTS

CN 1694045 11/2005
GB 2350712 12/2000
(Continued)

OTHER PUBLICATIONS

Author Unknown, "Face Detection: Technology Puts Portraits in Focus," Consumerreports.org, http://vvvvw.comsumerreports.org/cro/electronics-computers/camera-photograph/cameras, 2007, 1 page.
(Continued)

*Primary Examiner* — Aneeta Yodichkas
(74) *Attorney, Agent, or Firm* — Polsinelli LLP

(57) ABSTRACT

A transmissive element including a diffractive and/or refractive pattern can be used with a display screen of a computing device to allow the display screen to function as a near field optical sensor (NFOS). The NFOS can be used to detect shadows cast on the display screen, and/or bright objects detected near the display screen, which can be used to determine the relative position of one or more features with respect to the device. These features can be, for example, the fingers or thumbs of a user attempting to provide input to the computing device. The device can support motion or gesture detection using cameras of the device, and touch input using touch screen functionality, but the NFOS can enable the device to also track motion in the dead zone between the field of view of the cameras and the touch screen.

20 Claims, 7 Drawing Sheets

(51) Int. Cl.
*G06F 3/0488* (2013.01)
*G06F 3/0484* (2013.01)

(52) U.S. Cl.
CPC ...... *G06F 3/04883* (2013.01); *G06F 3/04886* (2013.01); *G06F 3/04845* (2013.01); *G06F 2203/04101* (2013.01); *G06F 2203/04108* (2013.01)

(58) Field of Classification Search
CPC ............ G06F 3/04886; G06F 3/04845; G06F 2203/04101
See application file for complete search history.

(56) References Cited

U.S. PATENT DOCUMENTS

| | | | |
|---|---|---|---|
| 5,616,078 | A | 4/1997 | Oh |
| 6,272,231 | B1 | 8/2001 | Maurer et al. |
| 6,314,241 | B1 | 11/2001 | Matsumura |
| 6,385,331 | B2 | 5/2002 | Harakawa et al. |
| 6,434,255 | B1 | 8/2002 | Harakawa |
| 6,523,025 | B1 | 2/2003 | Hashimoto et al. |
| 6,750,848 | B1 | 6/2004 | Pryor |
| 6,863,609 | B2 | 3/2005 | Okuda et al. |
| 7,301,526 | B2 | 11/2007 | Marvit et al. |
| 7,379,566 | B2 | 5/2008 | Hildreth |
| 7,401,783 | B2 | 7/2008 | Pryor |
| 7,519,223 | B2 | 4/2009 | Dehlin et al. |
| 7,853,050 | B2 | 12/2010 | Wang et al. |
| 8,788,977 | B2 | 7/2014 | Bezos |
| 8,902,125 | B1 | 12/2014 | Robbins et al. |
| 9,123,272 | B1 | 9/2015 | Baldwin et al. |
| 9,285,895 | B1 | 3/2016 | Baldwin et al. |
| 9,304,583 | B2 | 4/2016 | Bezos |
| 2002/0071277 | A1 | 6/2002 | Starner et al. |
| 2004/0135739 | A1 | 7/2004 | Fukushima et al. |
| 2004/0140956 | A1 | 7/2004 | Kushler et al. |
| 2005/0128190 | A1* | 6/2005 | Ryynanen ............. G06F 3/0421 345/173 |
| 2007/0164989 | A1 | 7/2007 | Rochford et al. |
| 2007/0236413 | A1 | 10/2007 | Gehlsen et al. |
| 2008/0005418 | A1 | 1/2008 | Julian |
| 2008/0013826 | A1 | 1/2008 | Hillis et al. |
| 2008/0019589 | A1 | 1/2008 | Yoon et al. |
| 2008/0040692 | A1 | 2/2008 | Sunday et al. |
| 2008/0136916 | A1 | 6/2008 | Wolff |
| 2008/0158096 | A1 | 7/2008 | Breed |
| 2008/0174570 | A1 | 7/2008 | Jobs et al. |
| 2008/0266257 | A1 | 10/2008 | Chiang |
| 2008/0266266 | A1 | 10/2008 | Kent et al. |
| 2008/0266530 | A1 | 10/2008 | Takahashi et al. |
| 2008/0276196 | A1 | 11/2008 | Tang |
| 2009/0031240 | A1 | 1/2009 | Hildreth |
| 2009/0079813 | A1 | 3/2009 | Hildreth |
| 2009/0265627 | A1 | 10/2009 | Kim et al. |
| 2009/0313584 | A1 | 12/2009 | Kerr |
| 2009/0322802 | A1 | 12/2009 | Noguchi et al. |
| 2010/0079426 | A1 | 4/2010 | Pance et al. |
| 2010/0103139 | A1 | 4/2010 | Soo et al. |
| 2010/0271299 | A1 | 10/2010 | Stephanick et al. |
| 2010/0302185 | A1* | 12/2010 | Han ........................ G06F 3/042 345/173 |
| 2011/0063295 | A1 | 3/2011 | Kuo et al. |
| 2011/0148859 | A1 | 6/2011 | Huang et al. |
| 2011/0157097 | A1 | 6/2011 | Hamada et al. |
| 2011/0267317 | A1* | 11/2011 | Tsuda .................. G02F 1/13338 345/175 |
| 2011/0291993 | A1* | 12/2011 | Miyazaki ................ G06F 3/042 345/175 |
| 2011/0292078 | A1 | 12/2011 | Lapstun et al. |
| 2012/0062845 | A1 | 3/2012 | Davis et al. |
| 2012/0218215 | A1 | 8/2012 | Kleinert et al. |
| 2012/0223916 | A1 | 9/2012 | Kukulj |

FOREIGN PATENT DOCUMENTS

| | | |
|---|---|---|
| GB | 2440348 | 1/2008 |
| JP | 2002-164990 | 6/2002 |
| JP | 2002-351603 | 12/2002 |
| JP | 2004-318826 | 11/2004 |
| JP | 2007-121489 | 5/2007 |
| JP | 2008-097220 | 4/2008 |
| JP | 2008-186247 | 8/2008 |
| WO | WO 02/15560 | 2/2002 |
| WO | WO 2006/036069 | 4/2006 |

OTHER PUBLICATIONS

Author Unknown, "Introducing the Wii MotionPlus, Nintendo's Upcoming Accessory for the Revolutionary Wii Remote at Nintendo:: What's New", Nintendo Games, http://vvvvvv.nintendo.com/whatsnewidetailieMMuRi_N6vntHPDycCJAKW hE09zBvyPH, Jul. 14, 2008, 2 pages.

Author Unknown, "Nokia N95 8GB Data Sheet," Nokia, 2007, 1 page.

Brashear, Helene, et al., "Using Multiple Sensors for Mobile Sign Language Recognition," International Symposium on Wearable Computers, 2003, 8 pages.

Cornell, Jay , "Does this Headline Know You're Reading It?", h+ Magazine,located at <located at http://hplusmagazine.com/articles/ai/does-headline-know-you%E2%80%99re-reading-it last accessed on Jun. 7, 2010, Mar. 19, 2010, 4 pages.

Haro, Antonio, et al., "Mobile Camera-Based Adaptive Viewing," MUM '05 Proceedings of the 4th International Conference on Mobile and Ubiquitous Mulitmedia., 2005, 6 pages.

International Search Report dated Apr. 7, 2010 for PCT Application No. PCT/US09/65364, 3 pages.

Padilla, Raymond , "Eye Toy (PS2)," <http://www.archive.gamespy.com/hardware/august03/eyetoyps2/index.shtml, Aug. 16, 2003, 2 pages.

Schneider, Jason , "Does Face Detection Technology Really Work? Can the hottest new digital camera feature of 2007 actually improve your people pictures? Here's the surprising answer!", http://vvwvv.adorama.com/catalog.tpi?article=052107op=academy_new, May 21, 2007, 5 pages.

Tyser, Peter , "Control an iPod with Gestures," http://www.videsignline.com/howto/170702555, Sep. 11, 2005, 4 pages.

Zyga, Lisa , "Hacking the Wii Remote for Physics Class," PHYSorg.com, http://vvwvv.physorg.com/news104502773.html, Jul. 24, 2007, 2 pages.

* cited by examiner

INTEGRATED NEAR FIELD SENSOR FOR DISPLAY DEVICES

CROSS-REFERENCE TO RELATED APPLICATIONS

This application is a divisional of U.S. patent application Ser. No. 13/432,675, filed on Mar. 28, 2012, the content of which is incorporated herein by reference.

BACKGROUND

People are increasingly utilizing computing devices, including portable and mobile devices, to perform various types of tasks. Accordingly, there is a desire to increase the ways in which users interact with the devices to perform these tasks. One interaction approach that is gaining in popularity involves gesture input. To provide gesture input, a user positions himself or herself in front of a camera or sensor bar and makes a motion with a feature such as the user's hand or arm. A computing device can capture images or sensor data to attempt to recognize the motion. Cameras or sensors used with such devices do not have full hemispheric fields of view, however, such that there is a zone near the device where a feature of the user is unable to be captured by the device. Thus, a user can provide input by touching the device or making gestures at least a minimum distance from the device, but is limited in providing input by the dead zone between those regions. While capacitive approaches can allow for some input in the dead zone, the range of these approaches is limited and they require a significant amount of power, which can be particularly undesirable for portable and mobile devices that have limited battery life.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to enabling a user to interact with an electronic device. In particular, various approaches discussed herein enable the relative position of various features to be determined even when those features are positioned within a dead zone of one or more cameras or sensors of the device. In various embodiments, a display screen or other such interface device can include a transmissive element (e.g., a transparent film or layer, for example) operable to receive light over an optically exposed region of the element. The transmissive element can include a plurality of diffractive and/or refractive features positioned with respect to the exposed region such that light incident on the exposed region is directed toward one or more sensors or detectors operable to measure an amount or intensity of light incident upon different portions of the exposed region. One or more algorithms can analyze the measurements to determine the location of one or more shadows on the exposed region that are cast by a feature of a user. Similarly, the same or alternative algorithms can attempt to determine relatively bright features corresponding to objects positioned near the exposed region that are illuminated by the transmissive element or another such object. The captured information can be analyzed to estimate a relative position of the feature with respect to the device, which can enable the device to track the feature even when the feature is in a position for providing input to the device but is no longer within a field of view of a camera of the device or in contact with the device.

Various other applications, processes, and uses are presented below with respect to the various embodiments.

Figure 1:
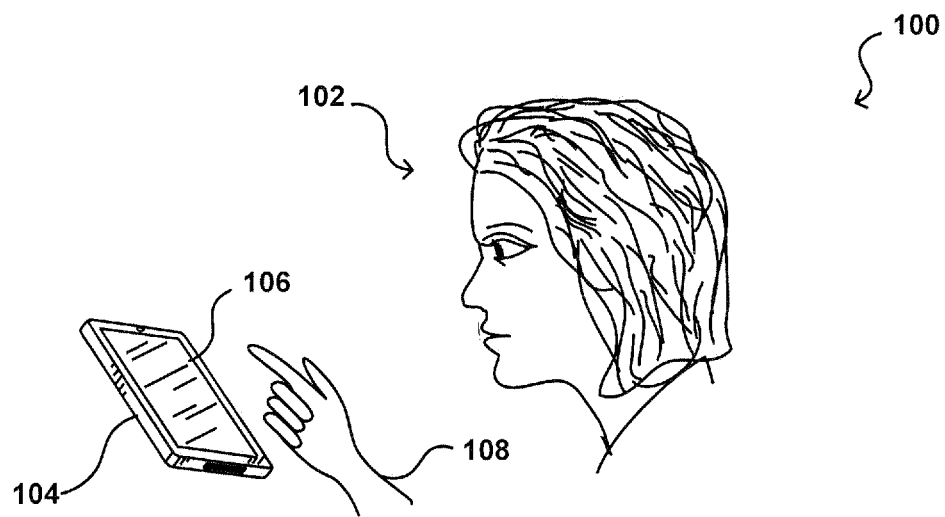
FIG. 1 illustrates an example situation of a user attempting to provide gesture input to a computing device in accordance with one embodiment.

FIG. 1 illustrates an example situation 100 wherein a user 102 is attempting to provide input using a display screen 106 of a computing device 104. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others. In various embodiments, a user can provide input by contacting a touch screen, which can accept input using approaches such as resistive and capacitive touch technology as known in the art. In some embodiments, a user can additionally (or alternatively) provide input using gesture or motion input. For gesture input, a user can make a motion or perform an action with an object or a feature of the user, such as the user's finger or hand 108, which can be captured by one or more cameras or sensors of the device. The captured image information can be analyzed by the device to determine various information, such as the relative position of a feature, motion of the feature, a shape of the feature, and other such information, in order to provide input to the computing device. In some embodiments, these approaches can be used together, where the device can track the position of a feature of the user while at a distance from the device in order to allow a user to select items or elements of an interface, for example, then type or provide other types of input for the selected items using a touch-based interface. Various other approaches or implementations can be provided as well within the scope of the various embodiments. Further, examples and details of approaches to providing gesture input can be found in co-pending U.S. patent application Ser. No. 12/332,049, filed Dec. 10, 2008, and entitled "Movement Recognition as Input Mechanism," which is hereby incorporate herein by reference.

Figure 2:
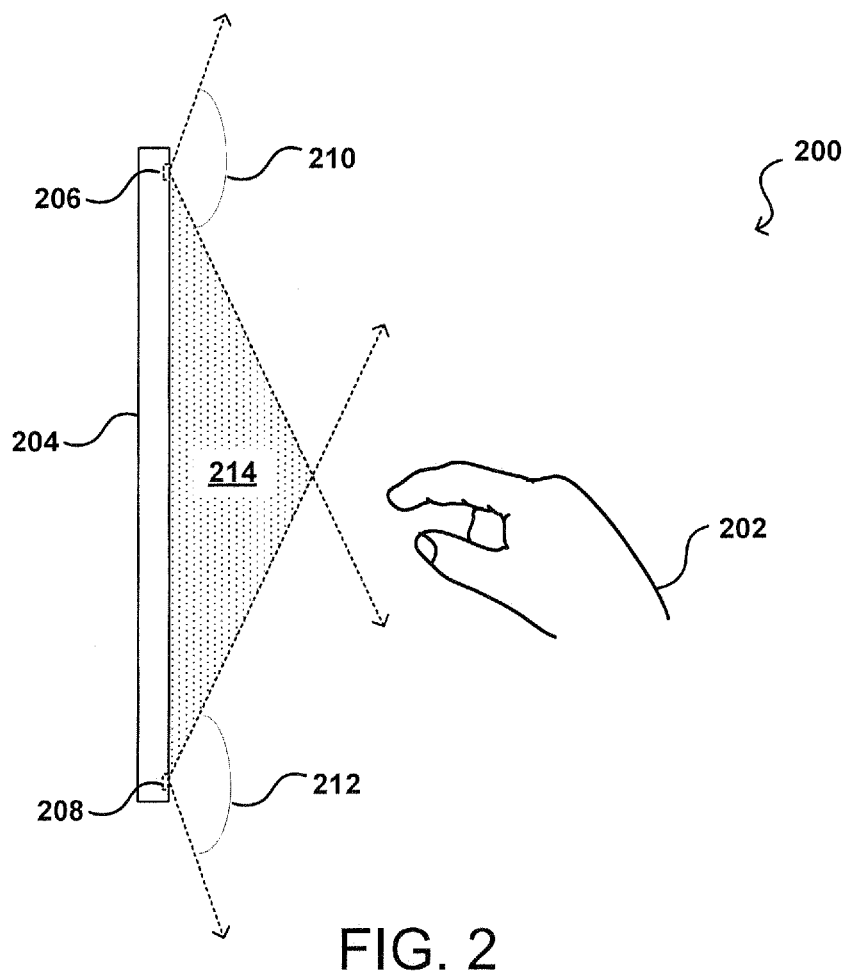
FIG. 2 illustrates an example dead zone resulting from the fields of view of cameras of a device in accordance with various embodiments.

As mentioned, however, the cameras or sensors of the device are not able to capture image information for the feature at all relevant locations. For example, FIG. 2 illustrates an example situation 200 wherein two cameras 206, 208 of a computing device 204 attempt to capture image information for a feature 202 of a user, such as a hand or finger, while that feature is providing a type of input to the computing device. In some embodiments, this can include tracking the feature when the feature is about to provide a specific type of input to the device, in order to predict where the user will provide input or enable the user to determine where the input will be provided. As illustrated, however, the relative position of the feature 202 of the user can only be determined by the device when the feature is contacting a touch sensitive portion of the device or within a field of view 210, 212 of one of the cameras 206, 208 of the device. If the feature is close to the screen but outside those fields of view, the feature will be in the dead zone 214 between the fields of view. Based on tracking the feature the device can determine that the feature is inside the dead zone and not contacting a touch sensitive component, but otherwise cannot determine the relative position within that dead zone. For a touch screen, for example, this leads to a region over essentially the entire screen where the relative position cannot be determined, which can prevent the device from accurately updating information displayed on the screen in response to the position of the feature.

Approaches in accordance with various embodiments can attempt to account for the dead zone by enabling the device to determine or estimate a relative position of the feature based at least in part upon one or more shadows, bright spots, or other such elements created by the feature and detected by the device. As mentioned above, a display screen or other such device can include an optical film or other such element that is able to receive light from a range of directions and direct that light to one or more sensors operable to measure aspects such as an intensity of light received over various regions of the film. By analyzing the locations where intensity is increased and/or reduced, as may correspond to shadows cast by a feature of a user or bright spots corresponding to illuminated portions of one or more user features, an algorithm executing on the device (or a system or service in communication with the device) can attempt to calculate, determine, or estimate the relative position of that feature with respect to the device.

Figure 3:
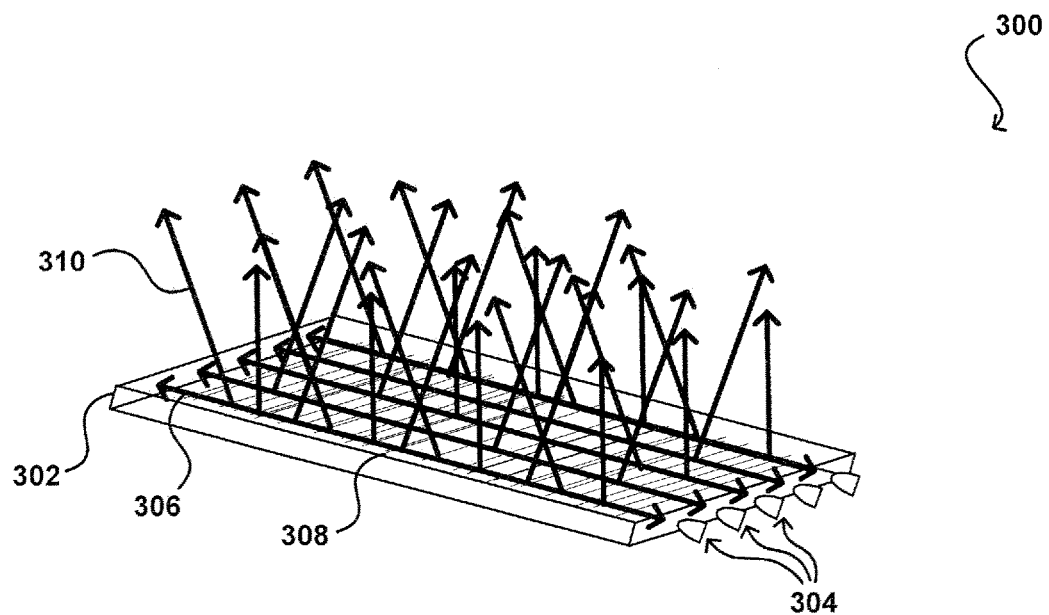
FIG. 3 illustrates an example of a brightness enhancing film assembly that can be used with a computing device in accordance with at least one embodiment.

FIG. 3 illustrates an example brightness enhancing component 300 that can be used in accordance with various embodiments. In this example, the component includes a brightness enhancing film (BEF) 302 and a plurality of light sources 304, such as light emitting diodes (LEDs), positioned to direct light into at least one edge of the film. The film can be a transparent plastic sheet used as part of a liquid crystal display (LCD) or other such device, which can function as a planar wave guide for the injected light. The light can be reflected from opposing surfaces of the film such that the injected light 306 tends to propagate back and forth within the film. Losses and partial transmissions or absorptions can occur as well, as is understood for transmissive layers. The film can include a pattern of refractive and/or diffractive elements 308 on a top surface or other region of the film, which can cause at least a portion of the injected light to be directed out of a specific side of the film over a varying range of angles. Various diffractive patterns for BEF devices are known in the art and as such will not be discussed in detail herein. The directed light 310 can be directed through an overlying LCD matrix display, or other such element, and can have a particular dispersion to compliment the optical properties of the matrix. The film and LCD matrix can be used together to provide a self-luminant high-resolution color display in at least some embodiments.

Figure 4:
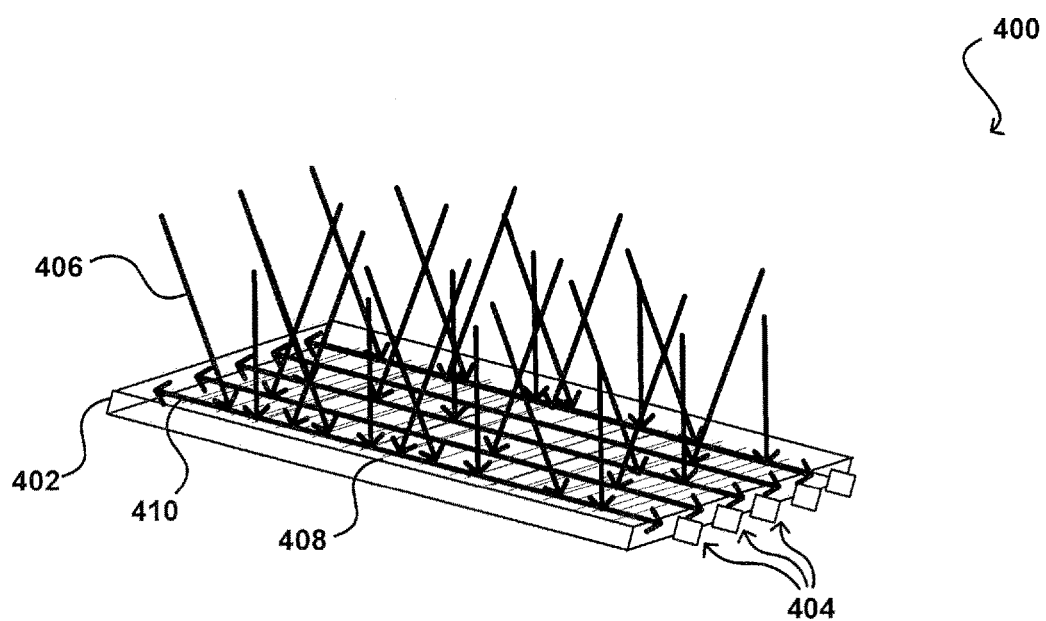
FIG. 4 illustrates an example implementation of a near field optical sensor that can be used in accordance with various embodiments.

Systems and methods in accordance with various embodiments can utilize such a transmissive element to alternatively, or additionally, allow for the receiving of diffuse light over a region of a display screen or other such element. For example, FIG. 4 illustrates an example situation 400 wherein an at least partially transparent transmissive element 402 is able to receive light over a plurality of angles to a receiving surface of the element. The transmissive element can be a film or layer, for example, formed from a plastic, polymer, glass, or other such material. As with the element discussed with respect to FIG. 3, the transmissive element 402 in FIG. 4 can include a pattern of refractive and/or diffractive elements 408 operable to direct at least a portion of the light 406, received to the receiving surface, to propagate at least one determined direction 410 within the element 402. In this example the light is directed such that light over various portions of the transmissive element are directed to a set of sensors 404, light detectors, cameras, or other such elements operable to capture or measure at least one aspect of the light exiting an edge of the element. Although shown along a single edge in this example, it should be understood that detectors can be placed along two or more edges of the transmissive element, and that any appropriate number and/or type of sensors or sensor arrays can be used within the scope of the various embodiments. By comparing information such as the intensity of light received by different sensors, a determination can be made as to an amount or intensity of light received by different regions of the transmissive element.

Figure 5A:
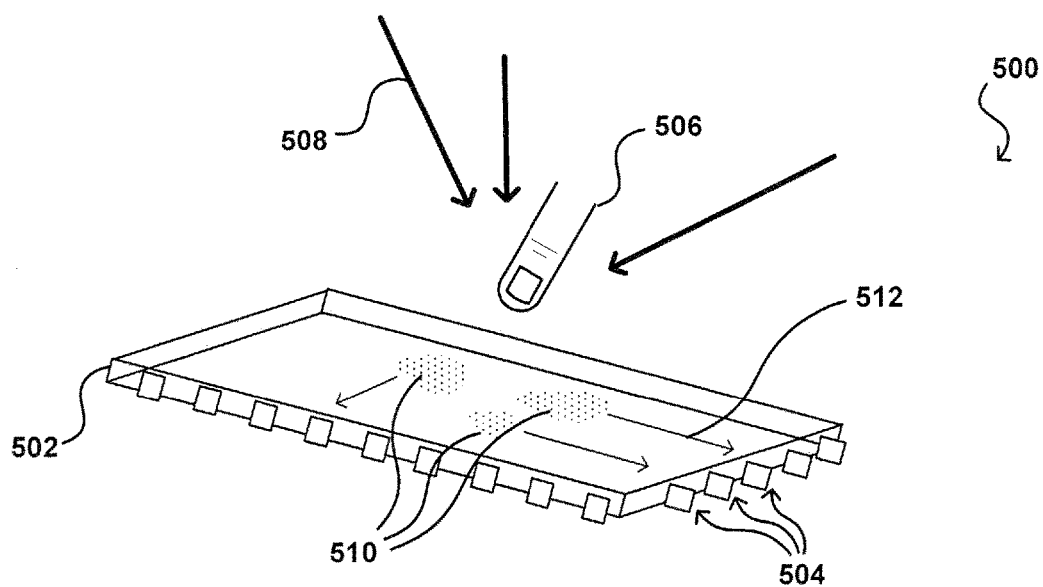
FIGS. 5(*a*) and 5(*b*) illustrate an example approach to determining distance for a feature within a distance of the near field optical sensor in accordance with various embodiments.

The ability to determine the amount of light received by different regions of a component such as a display element can enable a device to detect shadows and other variations in light incident on the component, which can assist with feature location in accordance with various embodiments. For example, FIG. 5(a) illustrates an example configuration 500 wherein a plurality of light detectors 504 are placed around two edges of a transmissive element 502 that has a diffractive and/or refractive pattern for directing incident light as discussed elsewhere herein. Although discrete detectors are illustrated, it should be understood that elements such as sensor bars, pixel line-arrays, or multi-part photodiodes can be used as well within the scope of the various embodiments. Further, although not illustrated it should be understood that circuitry and components for powering, reading, and processing information from the sensors can be included in a computing device utilizing the transmissive element and sensor configuration.

A transmissive element 502 such as that illustrated in FIG. 5(a) can be utilized in a display screen or component, such as an LCD screen or electronic ink display, where the transmissive element is positioned above, or below, the LCD matrix or other active display layer. It should be understood that terms such as "top" and "front" are used for simplicity of explanation and should not be interpreted as requiring a specific orientation unless otherwise stated. The transmissive element in at least some embodiments is not utilized with a lens or collecting element, such that the sensing of light will be only in the near-field, or within a limited range of the display screen or other relevant portion of the computing device. In at least some embodiments, the transmissive element and sensor configuration will only be able to pick up or distinguish variations in light such as shadows from features or objects within a few centimeters or less from the transmissive element. Such a range can be sufficient, however, to detect features such as fingers or thumbs of a user attempting to type or provide input with respect to a touch screen or similar element of a computing device.

For example, in the situation 500 of FIG. 5(a) a finger 506 of a user is approaching an optically exposed surface of the transmissive element. As used herein, "exposed" does not necessarily imply that the surface is able to be contacted by the finger, but is at least able to receive light from any at least partially transmissive layer positioned adjacent to, or a distance from, that surface. When the finger 506 is more than a detection distance away from the transmissive element, any shadows cast by the finger will be so diffuse that the variation will be virtually undetectable by the device. When the finger 506 (or other such feature) comes within a detection range of the device as illustrated in FIG. 5(a), however, one or more distinct shadow regions 510 can begin to appear on the transmissive element (e.g. caused by finger 506 obstructing light 508, etc.). The number, location, shape, and size of the shadow regions can depend upon factors such as the size, shape, and distance of the feature as well as the number, size, shape, and relative location of one or more light sources causing the shadow region(s) to be formed on the device.

Similarly, a finger or other such feature can be illuminated by a display screen or other such element of a computing device. The illuminated feature can be detected as a bright spot or area of higher intensity by the device. The number, location, shape, and size of the bright spot can be analyzed similar to, and/or in conjunction with, the shadow information.

As discussed, light 512 that is incident on the transmissive element can be re-directed by the transmissive and/or refractive pattern or features to be received by one or more light detectors 504. As should be apparent in light of the present disclosure, the intensity of light received from regions of the transmissive element having shadows cast thereon will be less than for regions without shadows. In this example, the variation in intensity can be determined in two dimensions across the transmissive element 502, such that a mapping of relatively low intensity regions can be determined. Assuming relatively standard lighting conditions in at least some embodiments, where a substantially similar intensity of light would be received to each region of the transmissive element when there were no obstructions between the light source(s) and the element, these areas or regions of relatively low intensity can be determined to correspond to shadows cast by features near the transmissive element. The size of the detection regions can depend at least in part upon the relative size and number of the light detectors 504, although data processing (e.g., interpolation) algorithms can attempt to provide a more continuous view of the intensity variations across the exposed surface of the transmissive element. The element then can effectively function as a light sensor that can be up to the full size of the display screen or other such element on a device.

By analyzing information such as the relative location of the shadow regions, including the separation of the regions, the device can make an estimate of the relative position of the feature of the user. As discussed, in at least some embodiments information about the feature can be captured by one or more cameras of a computing device. Using this information, the device can determine when the feature passes into the dead zone, which can provide relatively fixed boundaries as to the location of the feature casting shadows on the transmissive element. Further, the image information captured by the camera(s) can provide information such as the relative size of the feature and the relative position at which the feature enters the dead zone. This information can help to interpret the shadow information, as knowing the relative size and location of the feature as the feature starts casting detectable shadows can help to more accurately track the position within the dead zone using the shadows, as the size of the shadow will relate to the size of the object, and the relative size of the shadow can provide a determination as to the distance to the feature. Further, knowing the relative position of the feature as the feature enters the dead zone can help the device to determine the relative position of one or more light sources near the device, as a vector can be determined between a center point of a shadow and a center point of the feature as it enters the dead zone, or at other such locations, to determine an approximate direction of the light source. This information can help to determine the relative position of the feature based on the shadow and the relative position of one or more light sources. Further, if a user has more than one finger or thumb approaching the display, obtaining this information from captured image and/or video information can help to interpret the shadows as being related to multiple features and not necessarily multiple light sources. Various other such information can be determined as well, which can assist with the shadow-based location determinations.

Figure 5B:
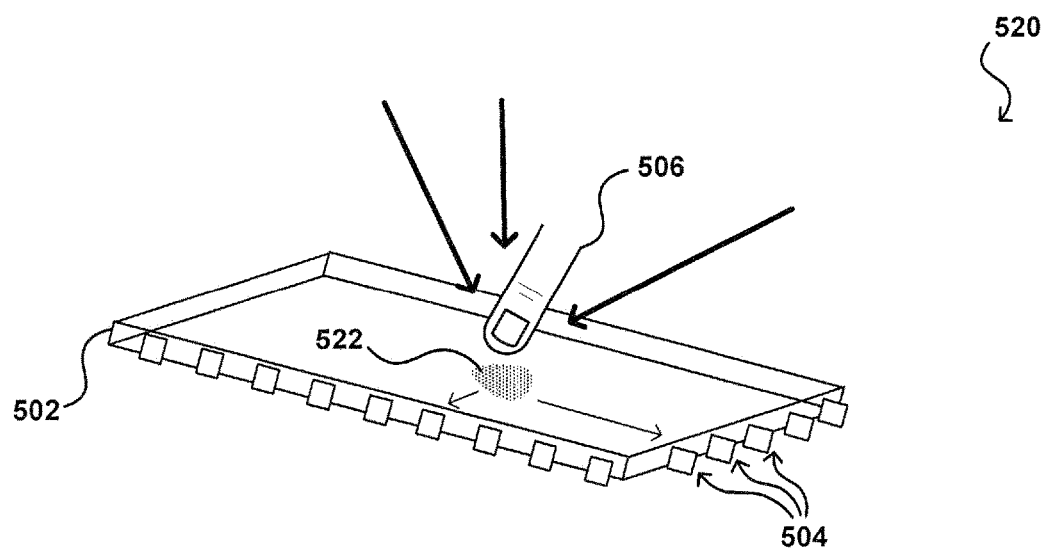

As illustrated in the example situation 520 of FIG. 5(b), the shadow regions will converge into a single shadow region 522 that will become more defined in size and shape as the user's finger gets closer to the surface of the display screen, and thus closer to the optically exposed surface of the transmissive element 502. As can be seen, the relative position, number, size, and definition of the shadow regions, among other such aspects, can be used to determine the distance to a feature, as well the approximate location of the feature with respect to the exposed surface of the transmissive element. As discussed, such an approach enables a user to provide input to the device using features such as the user's fingers, thumbs, a stylus or pen, or other such objects, even when the feature is not contacting the device or within a field of view of a device camera. Further, while such functionality can be implemented through additional components added to a computing device, various functions of a BEF and near-field optical sensor can be combined through use of a single transmissive element having both emitters and receivers positioned along the edge. In at least some embodiments, a diffractive and/or refractive pattern used to project disperse light from the BEF can be used to collect disperse light for the near field optical sensor (NFOS). In various embodiments, a BEF can be repurposed to function as a near-field sensor. In other embodiments, separate patterns might be included to direct light from a set of LEDS out of the element and direct light incident on the element to a set of sensors. Various other combinations or configurations can be utilized as well within the scope of the various embodiments.

In at least some embodiments, a display screen with an integrated panel supporting both BEF and NFOS functionality might have the LEDs or other light sources configured to activate at a relatively high rate, such as for every other frame of content on the display, which for a display refresh rate of 120 Hz would cause the LCD to operate at 60 Hz with a 50% duty cycle. Similarly, when the LEDs are not activated, the LCD can be in a maximally transparent mode in order to allow a maximum amount of light to be incident on the transmissive element. To make up for reduced duty cycle in some embodiments, the LEDs can be set to operate with twice the brightness such that the overall perception of brightness by the user, and the overall power consumption, will be similar. In some embodiments, the effective resolution of the device, or at least the discrimination of the device, can be increased by utilizing specific patterns on the LCD display when the LEDs are off and the LCD is in a transmissive mode. Placing the array of sensors along two sides of the transmissive element, for example, can lead to aliasing of some shadow positions. By alternating patterns such as stripes or checkerboards on the LCD display while in receiving mode, however, the aliasing of the shadows can be minimized.

Figure 6:
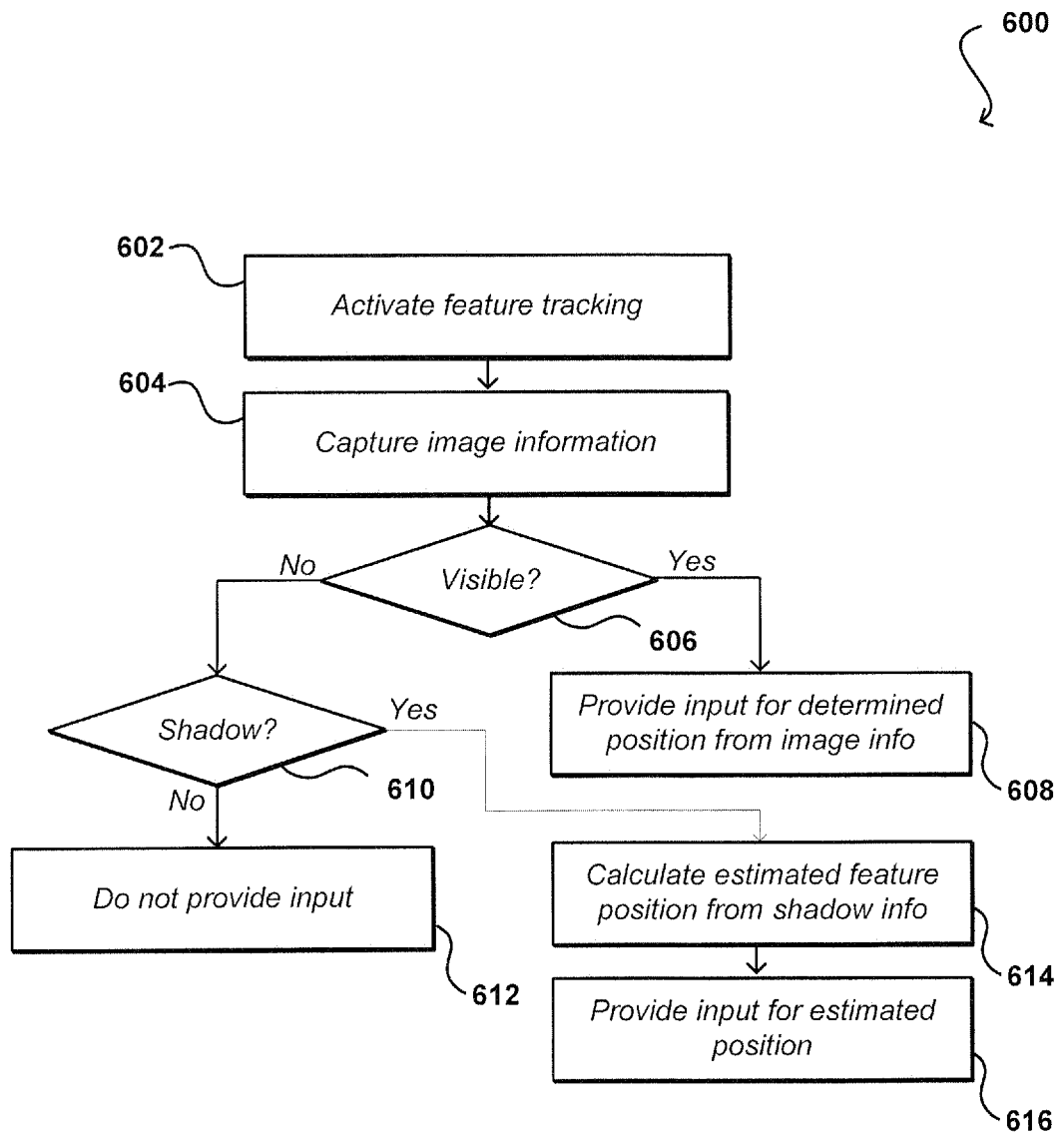
FIG. 6 illustrates an example process for providing position-based input that can be utilized in accordance with various embodiments.

FIG. 6 illustrates an example process 600 for determining the relative position of a feature with respect to a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, feature tracking is activated 602 on the computing device. The tracking can be activated manually by a user or automatically in response to an action on the computing device, such as the opening of an application or activation of certain functionality, etc. While feature tracking is active, image information can be captured 604 using at least one camera of the computing device. In embodiments where the device is tracking a feature relative to a component such as a display screen, the camera can be positioned to have a field of view able to capture a feature near at least a portion of the display screen, although other configurations can be utilized as well. If the feature is determined 606 to be visible in the captured image information, such as by using feature recognition or contour matching on the captured image information to locate the feature, the relative position of the feature can be determined from the captured image information and corresponding input provided 608 to the computing device. Such information can be useful for gesture tracking, feature tracking, or other such processes.

If the feature cannot be seen in the captured image information, a determination can be made 610 as to whether at least one shadow is present on a near field optical sensor element that is indicative of a nearby feature. In the same or other embodiments, a determination can also be made as to whether a bright spot corresponding to the feature is present near a near field optical sensor. In at least some embodiments, such determination is only made when the feature was first visible in the captured image information and then determined to have entered a dead zone near the device where the feature is no longer within a field of view of at least one camera of the device. Similarly, such determination might be made if the feature was previously contacting a touch screen of the device, for example, and is no longer contacting the device but unable to be seen in the captured image information. In some embodiments, the determination might be made when the captured image information indicates that a user is nearby, but a particular feature such as a finger or hand cannot be viewed by at least one camera on the device. Various other criteria can be used as well as should be apparent in light of the present disclosure. If the determination process is active and no shadow or bright spot is determined, and no feature is visible in the captured image information, then no feature position-related input is provided 612 to the device.

If one or more intensity variations are located by the near field optical sensor that are indicative of shadows or illuminated features, an estimated relative position of a feature of the user can be determined 614 based at least in part upon the determined intensity variation information. As discussed, information learned from previously captured image information or prior experience with a user can be used to assist with the position determination, as may include a size of a feature, a previous position, directions of light sources, and other such information. Once an estimated relative position is calculated, corresponding input can be provided 616 to the device. The process can continue, and updated position determinations can cause corresponding input to be provided to an application executing on the device, for example, which can utilize the information for gesture input, motion-based input, or other such information.

In certain situations, it is possible that at least a portion of the user's hand or finger will be visible in the field of view of a camera, but the fingertip will not be visible as being within a dead zone of the cameras on the device. Accordingly, approaches in accordance with various embodiments can utilize the fingertip shadow as detected by the near-field optical sensor with image information about the location of the hand or finger of the user to attempt to provide a more accurate determination of the position of the fingertip relative to the device.

Figure 7:
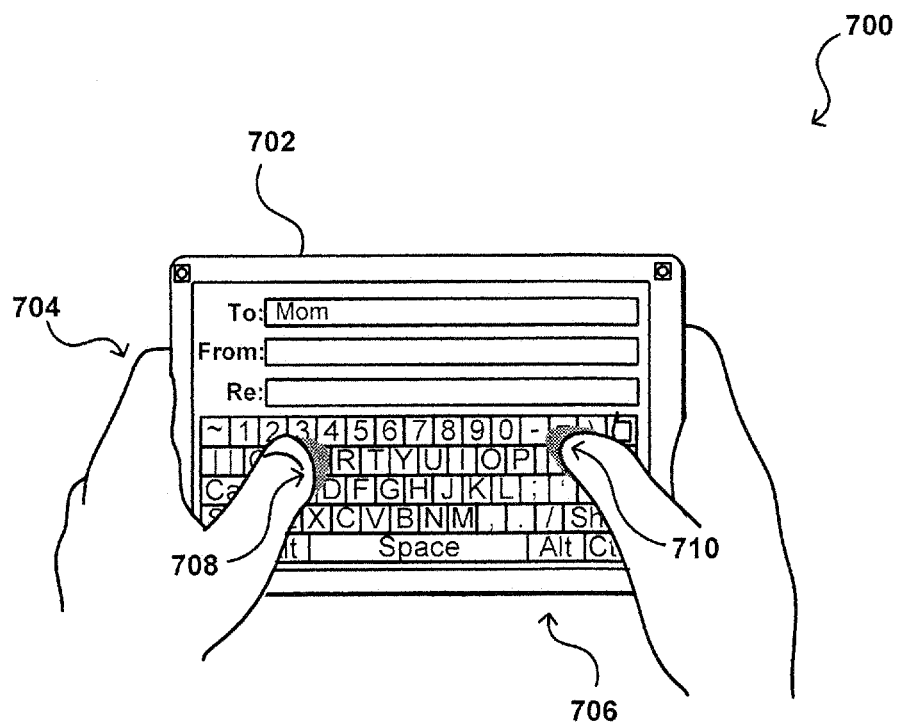
FIG. 7 illustrates an example approach to assisting with touch input that can be used in accordance with various embodiments.

FIG. 7 illustrates an example situation 700 wherein a user is using two thumbs to enter text into a touch screen of a computing device 702. In this example, the user is holding the device in his or her hands 704, and selecting text on a virtual keyboard 706 displayed on a touch sensitive display screen of the device. In this example, the device might be configured to highlight letters that the user's thumbs are hovering over, in order to help the user provide the correct input when touching the screen. For example, the key for the letter "A" might become bigger, change color, be highlighted, or otherwise change in appearance with the user's thumb is over this key, enabling the user to determine that if the user taps on the screen at the current location the letter "A" will be selected. While cameras of the device might be able to determine some of these positions, the dead zone might cover use of letters close to a center of the display screen. Accordingly, the device can monitor the shadow positions 708, 710 of the user's thumbs to assist in determining the respective positions using processes discussed elsewhere herein. Such an approach can benefit a user providing text input using a touch screen, as the letters or characters can be relatively small and otherwise difficult to accurately select using the user's thumbs.

In at least some embodiments, the accuracy of such an approach can depend at least in part upon the quality of ambient light near the device. For example, a computing device that is outside one a sunny day might be able to provide very accurate results as the sun will act as a strong, relatively stationary (on a short time scale) single light source. When inside an auditorium or shopping mall with a large number of diffuse light sources, however, the results might be much less effective, or at least the range of the approach might be limited as the feature will only cast a strong shadow when near the device. In a situation where there are multiple light sources, a computing device can process the resulting shadows and converge upon a determined relative position of the feature generating the shadows. In some embodiments, the device can monitor the location and movement of shadows after the user contacts the display screen, for example, and can use this information to determine information about the surrounding light sources. In some embodiments, a computing device can use sensor or image data to locate various light sources. For example, if the device is able to capture a light source with a camera (without saturating the camera over a range of angles) then the device can determine a relative direction of that light source. Similarly, the device might utilize one or more shadow sensors operable to determine a relative direction or position of one or more light sources near the device. Examples of such shadow sensors can be found, for example, in co-pending U.S. patent application Ser. No. 13/107,710, filed May 13, 2011, and entitled "Realistic Image Lighting and Shading," which is hereby incorporated herein by reference.

As discussed, a variety of different diffractive and/or refractive patterns can be used with various embodiments. The patterns will generally accept light over at least a specified range of angles, and direct that light to one or more sensors or sensor arrays, acting as a diffractive planar light guide. In many cases, specific patterned features will be embossed, printed on, stamped in, or otherwise formed in, or onto, the transmissive element. A pattern can be comprised of micron and sub-micron features in any of a variety of patterns, which can be very complex for certain devices. Various mathematical modeling approaches, such as may be based on Fourier mathematics or other such approaches known for creating diffractive or refractive patterns, can be used to determine the shape, size, and location of features of the pattern, such as a complex patter of divots forms in the a sheet that, through diffraction, reassemble the incident light. While various conventional patterns can be used that are used today with BEF devices, specific patterns can be developed based at least in part upon the regions of the transmissive element where shadows are to be detected, the relative size of those regions, the relative size and number of sensors to detect the intensity of the regions, and the relative position of those sensors.

For example, examples discussed herein have an array of sensors along one or two edges of a transmissive element. Certain embodiments can have sensors around all edges, as may be interspersed among LEDs or other such elements. In some embodiments, a number of discrete sensors could be positioned at any appropriate location around the transmissive element, and the pattern of the sheet can be configured to direct light from a central region or other portion of the element to the discrete sensors. In some embodiments, a central portion of the display screen might be analyzed, as the size of the dead zone will decrease towards the edge in many embodiments. In one embodiment, planar sensors can be in optical contact with an edge of the transmissive layer along one side, but the pattern can be such that light is directed so two-dimensional information can be determined from the one-dimensional array of planar sensors. Other configurations are possible as well, such as may include placing sensors at the corners of the layer or other such locations.

While many examples presented herein relate to text input and element selection, it should be understood that feature tracking can be advantageous with other applications that utilize position information as well. For example, gaming and drawing applications can benefit from being able to track features of a user over a larger range of motion. Even when a user uses a stylus or other such device to provide input, the approach can benefit from feature tracking approaches discussed herein.

Various other approaches can be used to assist with locating and track specific features over time as well. One such approach utilizes ambient-light imaging with a digital camera (still or video) to capture images for analysis. In at least some instances, however, ambient light images can include information for a number of different objects and thus can be very processor and time intensive to analyze. For example, an image analysis algorithm might have to differentiate the head from various other objects in an image, and would have to identify the head as a head, regardless of the head's orientation. Such an approach can require shape or contour matching, for example, which can still be relatively processor intensive. A less processor intensive approach can involve separating the head from the background before analysis.

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). In one example, an LED or other source of illumination is activated (e.g., flashed or strobed) during a time of image capture of at least one camera or sensor. If the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the head has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

It also should be understood that, in addition to information such as zoom level and field of view, it can also be important in at least some embodiments for the software to know the relative position of the cameras or other image capture elements on the device. For example, image information can be analyzed to determine directions or position vectors to features, but those determinations are relative to a center point (or other position) of the camera capturing that image information. In order to properly combine the vectors from different images to determine an intersection point, the separation between the cameras capturing those images should also be taken into account in at least some embodiments. Various approaches for three-dimensional mapping or modeling using stereoscopic imaging or other such approaches based at least in part upon camera separation can be used as known or used in the art. Other approaches such as active capacitive, passive capacitive, and ultrasonic approaches can be used for finger detection, and processes such as ambient or IR imaging, at one or more wavelengths, can be used for eye detection, among other such processes.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features.

Figure 8:
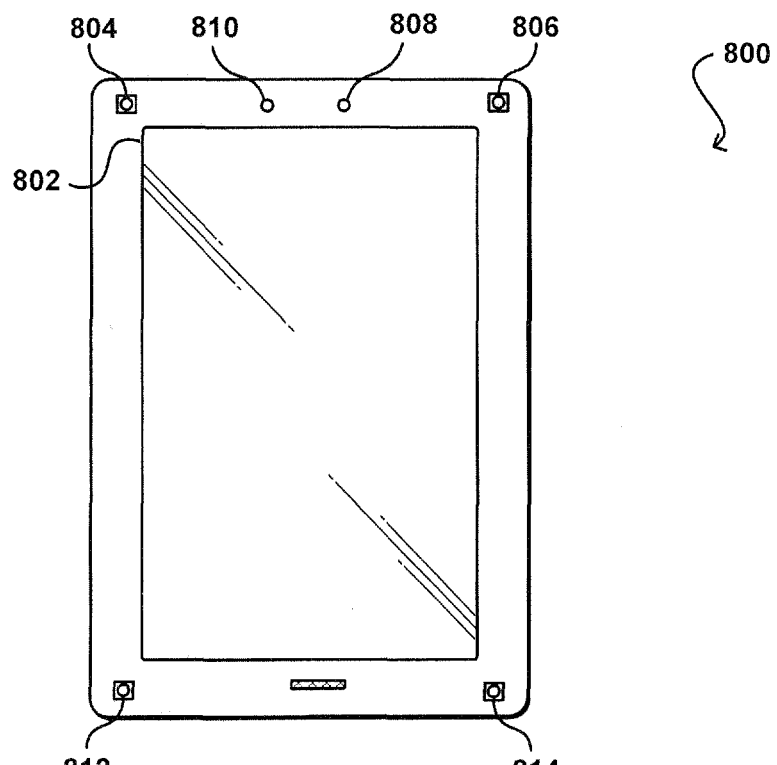
FIG. 8 illustrates an example computing device that can be used in accordance with various embodiments.

FIG. 8 illustrates an example computing device 800 that can be used to perform methods in accordance with various embodiments discussed and suggested herein. In this example, the device has four image capture elements 804, 806, 812, 814 positioned at various locations on the same side of the device as a display element 802, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices. As discussed, the display element 802 can include, or be associated with, various components enabling BEF or NFOS functionality to be utilized on the device.

In this example, a light sensor 808 is included that can be used to determine an amount of light in a general direction of objects to be captured and at least one illumination element 810, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 9:
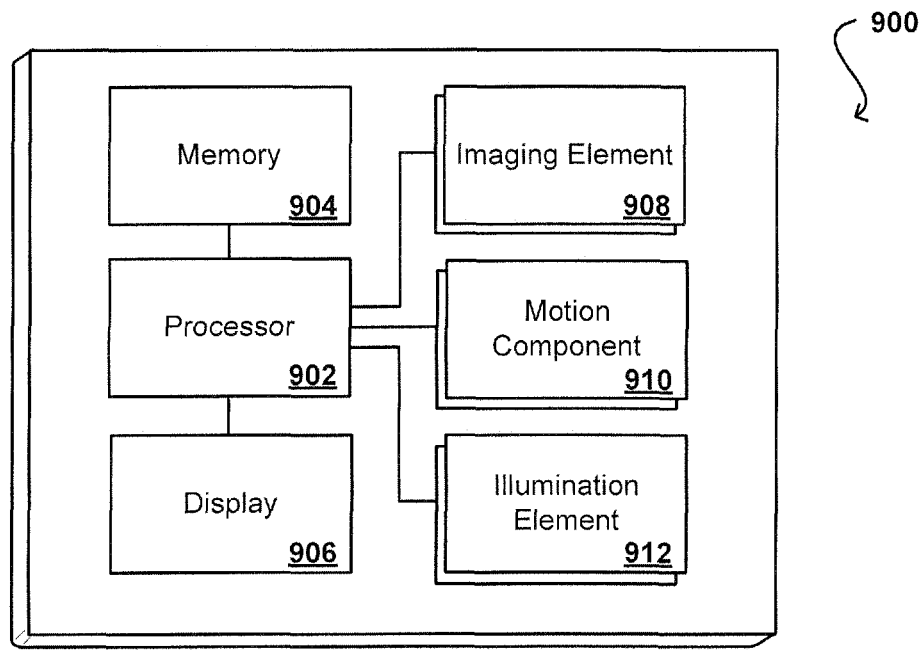
FIG. 9 illustrates an example configuration of components of a computing device such as that illustrated in FIG. 8.

In order to provide various functionality described herein, FIG. 9 illustrates an example set of basic components of a computing device 900, such as the device 800 described with respect to FIG. 8. In this example, the device includes at least one central processor 902 for executing instructions that can be stored in at least one memory device or element 904. As would be apparent to one of ordinary skill in the art, the device can include many types of memory, data storage or non-transitory computer-readable storage media, such as a first data storage for program instructions for execution by the processor 902, the same or separate storage can be used for images or data, a removable storage memory can be available for sharing information with other devices, etc. The device typically will include some type of display element 906, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. The touch screen can include, or be associated with, various transmissive elements, LEDs, light sensors, and other components useful in providing BEF or NFOS technology as discussed elsewhere herein.

As discussed, the device in many embodiments will include at least one image capture element 908, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 910, such as an electronic gyroscope used to determine motion of the device for assistance in input determination. The device also can include at least one illumination element 912, as may include one or more light sources (e.g., white light LEDs, IR emitters, or flash lamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 10:
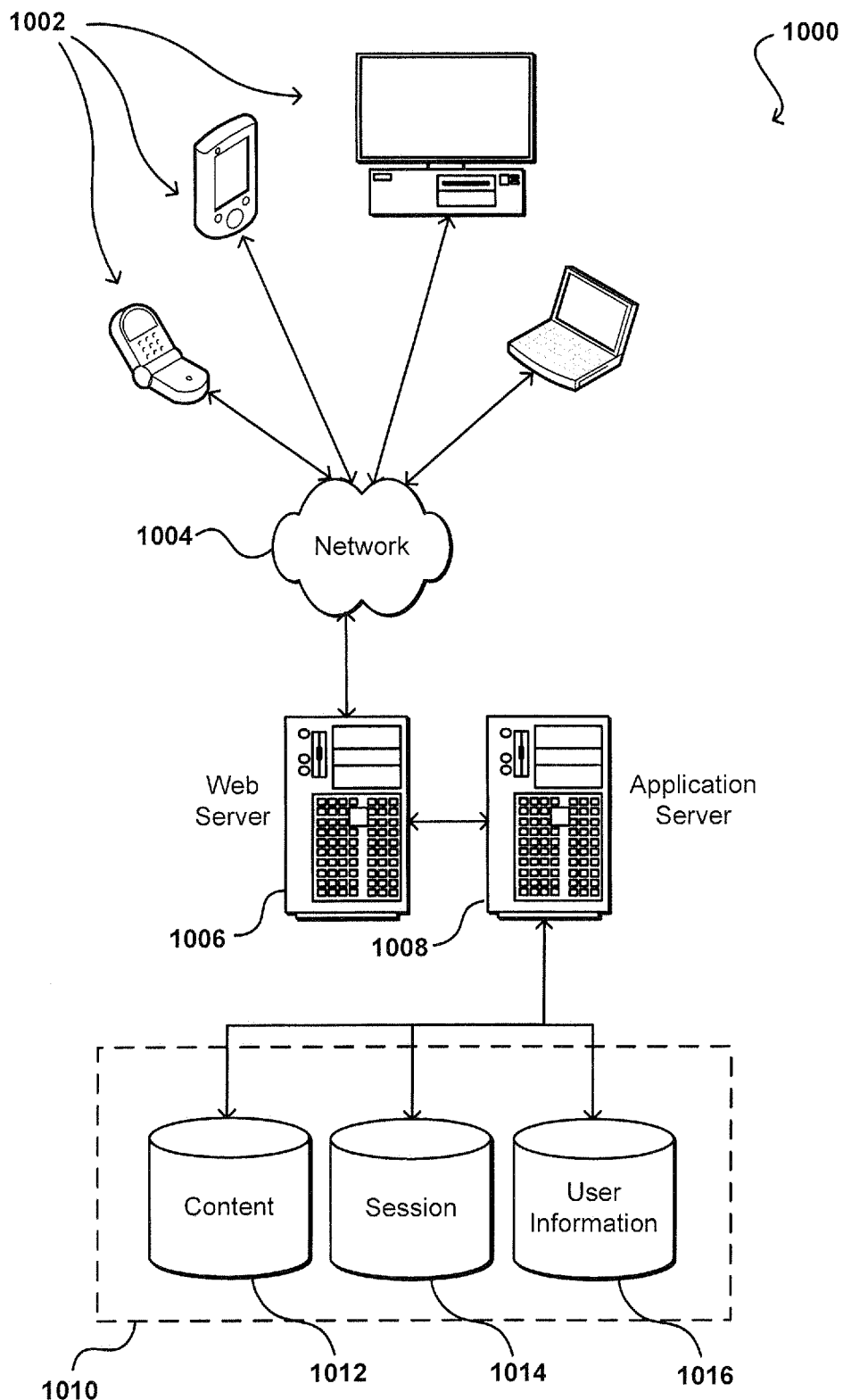
FIG. 10 illustrates an example environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a processor;
   a display screen that includes a transmissive layer having a diffractive pattern configured to direct at least a portion of light received over a plurality of angles incident on a plurality of regions of the display screen to a plurality of light sensors near at least one edge of the transmissive layer; and
   memory including instructions that, when executed by the processor, cause the computing device to:
      detect intensity values of the at least the portion of light incident on the plurality of regions of the display screen using the plurality of light sensors;
      analyze variations in the intensity values caused by a shadow on the display screen to determine a difference between a first intensity value corresponding to a first region of the display screen and a second intensity value corresponding to at least a second region of the display screen; and
      determine a position with respect to the computing device for one or more objects that cast the shadow on the display screen based on one or more characteristics of the first intensity value.

2. The computing device of claim 1, further comprising:
   at least one camera operable to capture image information within a field of view, and
   wherein the instructions, when executed, further cause the computing device to track movement of the one or more objects based on the variations in the intensity values when the one or more objects is outside the field of view of the camera.

3. The computing device of claim 1, further comprising:
   at least one camera operable to capture image information within a field of view, and
   wherein the instructions, when executed, further cause the computing device to determine the position with respect to the computing device for the one or more objects based on the image information.

4. The computing device of claim 1, wherein the instructions, when executed, further cause the computing device to:
   determine at least one of a size, or a shape of the one or more objects based on the variations in the intensity values caused by the shadow on the display screen.

5. The computing device of claim 1, wherein the instructions, when executed, further cause the computing device to:
   track the position for the one or more objects over time; and
   determine at least one of a motion input, a gesture input, or a position input from a user based on the position of the one or more objects over time.

6. The computing device of claim 1, further comprising at least one camera, wherein the instructions, when executed, further cause the computing device to:
   determine at least one of a size, or a shape of the one or more objects based on image information captured by the at least one camera; and
   determine the position for the one or more objects based at least in part on the at least one of the size or the shape of the one or more objects.

7. The computing device of claim 1, wherein the display screen further includes an active display layer and at least one light source associated with the active display layer.

8. The computing device of claim 1, wherein the transmissive layer is formed from a plastic sheet, and wherein the diffractive pattern is embossed in the plastic sheet.

9. The computing device of claim 1, wherein the transmissive layer is further configured to function as a brightness enhancing film.

10. A non-transitory computer-readable storage medium for storing instructions, the instructions, when executed by a processor of a computing device, cause the computing device to:

detect, using one or more light sensors, intensity values for light received over a plurality of angles on a display screen of the computing device, the light directed to the one or more light sensors by a diffractive pattern of the display screen;

analyze variations in the intensity values caused by a shadow on the display screen to determine a difference between a first intensity value corresponding to a first region of the display screen and a second intensity value corresponding to at least one other region of the display screen; and determine a position with respect to the computing device for one or more objects that cast the shadow on the display screen based at least in part on one or more characteristics of the first intensity value.

11. The non-transitory computer-readable storage medium of claim 10, wherein the instructions, when executed, further cause the computing device to:

capture image information by at least one camera of the computing device, the image information represents the one or more objects within a field of view of the at least one camera located at a distance from the display screen; and determine the position of the one or more objects based on the variations in the intensity values when the one or more objects are outside the field of view of the camera.

12. The non-transitory computer-readable storage medium of claim 10, wherein the instructions, when executed, further cause the computing device to:

determine at least one of a size, or a shape of the one or more objects based on the variations in the intensity values caused by the shadow on the display screen.

13. The non-transitory computer-readable storage medium of claim 10, wherein the instructions, when executed, further cause the computing device to:

track the position for the one or more objects over time; and determine at least one of a motion input, a gesture input, or a position input from a user based on the position of the one or more objects over time.

14. The non-transitory computer-readable storage medium of claim 10, wherein the instructions, when executed, further cause the computing device to:

capture image information using at least one camera of the computing device;

determine at least one of a size, a shape, or a location of the one or more objects based on the image information; and determine the position with respect to the computing device for the one or more objects based on the at least one of the size, the shape, or the location of the one or more objects.

15. The non-transitory computer-readable storage medium of claim 10, wherein at least one of the one or more objects includes one of a finger, a thumb, a hand, an arm, a pen, or a stylus.

16. A method, comprising:

detecting, by one or more light sensors of a computing device, intensity values from light received over a plurality of angles on a display screen of the computing device, the light directed to the one or more light sensors by a diffractive pattern of the display screen;

analyzing, by a processor of the computing device, variations in the intensity values caused by a shadow on the display screen to determine a difference between a first intensity value corresponding to a first region of the display screen and a second intensity value corresponding to at least one other region of the display screen; and determining, by the processor, a position with respect to the computing device for one or more objects that cast the shadow on the display screen based at least in part on one or more characteristics of the first intensity value.

17. The method of claim 16, further comprising:

tracking movement of the one or more objects based on the variations in the intensity values when the one or more objects is outside a field of view of a camera of the computing device.

18. The method of claim 16, further comprising:

determining at least one of a size, or a shape of the one or more objects based on the variations in the intensity values caused by the shadow on the display screen.

19. The method of claim 16, further comprising:

tracking, by the processor, the position for the one or more objects over time; and determining, by the processor, at least one of a motion input, a gesture input, or a position input from a user based on the position of the one or more objects over time.

20. The method of claim 16, further comprising:

capturing image information within a field of view of at least one camera of the computing device, the image information represents the one or more objects located at a distance from the display screen; and determining the position for the one or more objects based on the image information.

* * * * *